US010927519B1

(12) United States Patent
Choi et al.

(10) Patent No.: US 10,927,519 B1
(45) Date of Patent: Feb. 23, 2021

(54) RECOVERY SYSTEM FOR LARGE-SCALE SPILLED OIL FLOWING ONTO AND ADHERED TO SHORE

(71) Applicant: KOREA INSTITUTE OF OCEAN SCIENCE & TECHNOLOGY, Busan (KR)

(72) Inventors: Hyuek Jin Choi, Daejeon (KR); Cheon Hong Min, Sejong-si (KR); Meang-Ik Cho, Daejeon (KR); Jaewon Oh, Geoje-si (KR); Tae Kyeong Yeu, Sejong-si (KR)

(73) Assignee: Korea Institute of Ocean Science & Technology, Busan (KR)

( * ) Notice: Subject to any disclaimer, the term of this patent is extended or adjusted under 35 U.S.C. 154(b) by 0 days.

(21) Appl. No.: 17/081,415

(22) Filed: Oct. 27, 2020

(30) Foreign Application Priority Data

Mar. 3, 2020  (KR) .......................... 10-2020-0026585

(51) Int. Cl.
*E01H 12/00*  (2006.01)
*B01D 17/02*  (2006.01)
(Continued)

(52) U.S. Cl.
CPC ....... *E01H 12/006* (2013.01); *B01D 17/0202* (2013.01); *B01D 17/0214* (2013.01);
(Continued)

(58) Field of Classification Search
CPC ... E01H 12/006; E02B 15/046; E02B 15/047; E02B 15/048; E02B 15/103; E02B 15/104; E02B 15/105; C02F 1/40; B01D 17/0214
(Continued)

(56) References Cited

U.S. PATENT DOCUMENTS 3,700,108 A * 10/1972 Richards ............... E02B 15/104
210/242.3
3,968,041 A    7/1976 De Voss
(Continued)

FOREIGN PATENT DOCUMENTS

KR         10-0488391 B1     5/2005
KR     10-2015-0110085 A    10/2015
(Continued)

OTHER PUBLICATIONS

Office Action dated Apr. 21, 2020 in Korean Application No. 10-2020-0026585, in 10 pages.
(Continued)

*Primary Examiner* — Christopher Upton
(74) *Attorney, Agent, or Firm* — Knobbe Martens Olson & Bear LLP

(57) ABSTRACT

A recovery system for large-scale spilled oil flowing onto and adhered to a shore is disclosed. The recovery system for large-scale oil flowing onto and adhered to a shore is mounted on an amphibious vehicle that can move on a neritic zone and land. A skimmer assembly is installed in a front of the amphibious vehicle. An oil collection assembly is foldably provided on each of front opposite sides of the amphibious vehicle, thereby easily collecting oil. A recovered oil treatment assembly is mounted on the amphibious vehicle and configured to accommodate the oil recovered by the skimmer assembly therein and to store separated oil by separating water from the accommodated oil.

12 Claims, 12 Drawing Sheets

(51) Int. Cl.
*C02F 1/40* (2006.01)
*B01D 29/00* (2006.01)
*B01D 21/24* (2006.01)
*B60F 3/00* (2006.01)
*B01D 21/00* (2006.01)
*E02B 15/10* (2006.01)
*E02B 15/04* (2006.01)

(52) U.S. Cl.
CPC ..... *B01D 17/0217* (2013.01); *B01D 21/0018* (2013.01); *B01D 21/2455* (2013.01); *B01D 21/2461* (2013.01); *B01D 21/2472* (2013.01); *B01D 29/0018* (2013.01); *B60F 3/0061* (2013.01); *C02F 1/40* (2013.01); *E02B 15/047* (2013.01); *E02B 15/103* (2013.01); *B01D 2221/08* (2013.01); *C02F 2201/008* (2013.01)

(58) Field of Classification Search
USPC .... 210/170.01, 170.11, 241, 242.3, 776, 923
See application file for complete search history.

(56) References Cited

U.S. PATENT DOCUMENTS

| | | | | |
|---|---|---|---|---|
| 4,410,426 A | * | 10/1983 | Cloutier | E02B 15/104 210/241 |
| 4,542,550 A | * | 9/1985 | Bennett | E01H 12/006 15/3 |
| 4,575,426 A | * | 3/1986 | Littlejohn | E01H 12/006 210/242.4 |
| 4,758,355 A | * | 7/1988 | Levine | E01H 12/006 210/923 |
| 4,921,605 A | * | 5/1990 | Chastan-Bagnis | E02B 15/046 210/242.3 |
| 5,043,064 A | * | 8/1991 | Abell | E02B 15/103 210/242.3 |
| 5,302,210 A | * | 4/1994 | Whyte | E01H 12/006 210/923 |
| 5,469,645 A | * | 11/1995 | Aiken | E01H 1/001 210/923 |
| 5,647,975 A | * | 7/1997 | Bronnec | E02B 15/046 210/242.3 |

FOREIGN PATENT DOCUMENTS

| | | |
|---|---|---|
| KR | 20-2018-0001295 U | 5/2018 |
| WO | WO 85/05644 | 5/2018 |

OTHER PUBLICATIONS

Decision to Grant dated Jun. 1, 2020 in Korean Application No. 10-2020-0026585, in 5 pages.

* cited by examiner

RECOVERY SYSTEM FOR LARGE-SCALE SPILLED OIL FLOWING ONTO AND ADHERED TO SHORE

CROSS REFERENCE TO RELATED APPLICATION

The present application claims priority to Korean Patent Application No. 10-2020-0026585, filed Mar. 3, 2020, the entire content of which is incorporated herein for all purposes by reference in its entirety.

BACKGROUND

Field

The present disclosure relates to a recovery system for large-scale spilled oil flowing onto and adhered to a shore. More specifically, the present disclosure relates to a recovery system for large-scale spilled oil flowing onto and adhered to a shore.

Description of the Related Technology

Generally, due to a spilled oil accident occurring on the sea, a marine ecosystem as well as a natural ecosystem such as a beach, a shore, or a coastal area adjacent to a spill accident spot are damaged.

Spilled oil forms an oil film on the sea to pollute the sea, and pollutes the entire shore by being pushed to the shore by an influence of wind or tides while floating on the sea. In particular, at low tide, the oil remains on a sandy beach or a gravel field, thereby causing serious environmental and ecosystem damage to a wide range of the shore. Therefore, in order to prevent additional environmental pollution, it is important to recover large amounts of the spilled oil on the sea, thereby preventing the oil from entering onto the shore or to quickly remove the oil adhered to the shore or to quickly remove the oil adhered to the shore.

The foregoing is intended merely to aid in the understanding of the background of the present disclosure, and is not intended to mean that the present disclosure falls within the purview of the related art that is already known to those skilled in the art.

SUMMARY

Accordingly, an aspect of the present disclosure provides a recovery system for large-scale spilled oil flowing onto and adhered to a shore, the recovery system being configured to remove and recover oil flowing onto or adhered to the shore while freely moving around a shoreline, a neritic zone and land.

In addition, another aspect of the present disclosure is to provide a recovery system for large-scale spilled oil flowing onto and adhered to a shore that is configured to directly transfer oil recovered at a site to an external oil storage tank or to separate and store oil and water on its own.

Still another aspect of the present invention provides a recovery system being configured to be able to recover or remove large-scale spilled oil, which is flowing onto or adhered to a beach, a shore, or a wide range of shorelines adjacent to the sea, by being mounted on an amphibious vehicle, on a large scale within a short time.

According to an embodiment of the present disclosure, a recovery system for large-scale spilled oil flowing onto and adhered to a shore, the system may include: a skimmer assembly installed in a front of the amphibious vehicle, configured to desorb oil adhered to a surface of coastal sand or gravel, and recover oil by vacuuming up oil flowing onto the shore; an oil collection assembly foldably provided on each of front opposite sides of the amphibious vehicle and configured to collect the oil toward the skimmer assembly; and a recovered oil treatment assembly configured to selectively accommodate the oil recovered by the skimmer assembly, separate water from the accommodated oil and store the separated oil, and supply the water separated from the oil to the oil collection assembly.

The skimmer assembly may include: a brush skimmer rotatably provided with a rotation roller desorbing oil; a scraper configured to desorb oil and foreign substances by scraping off the brush skimmer; a skimmer conveyor configured to transfer the oil and foreign substances desorbed by the scraper to the recovered oil treatment assembly; and a first transfer pump positioned below the scraper and configured to transfer oil and water dropped from a bottom side of the scraper to the recovered oil treatment assembly or to the outside.

The brush skimmer may further include: the rotation roller rotatably provided in a horizontal direction and spirally provided with a brush along a longitudinal direction on an outer surface thereof; a cover plate having opposite sides rotatably connected to opposite ends of the rotation roller, respectively, and configured to shield a top side of the rotating roller; a guide screw rotatably provided inside the cover plate and configured to transfer the oil and foreign substances desorbed by the scraper to an entrance direction of the skimmer conveyor; and an oil accommodation vessel positioned below the scraper and configured to accommodate the oil and water dropped from the bottom side of the scraper and provided with the first transfer pump disposed therein.

The system may further include connection arms provided in directions parallel to each other in the front of the amphibious vehicle, each of the arms having one side hinge-coupled to a front side of the amphibious vehicle and an opposite side connected to the cover plate.

The skimmer conveyor may include: a belt part configured to transfer the oil received from the rotation roller to the recovered oil treatment assembly while circulating between the rotation roller and the recovered oil treatment assembly by having one side positioned toward the rotation roller and an opposite side connected to the recovered oil treatment assembly; and transfer plates extending in directions orthogonal to and disposed at regular intervals on an outer surface of the belt part.

A lower end of the skimmer conveyor may be configured to be expandable and contractible in a telescopic way and may be operated interlocked with the brush skimmer.

The skimmer assembly may further include: a vacuum suction skimmer positioned at a rear of the brush skimmer and provided with a suction portion for vacuuming up oil floating on a water surface; and a vacuum tank connected to the vacuum suction skimmer and configured to transmit vacuum suction force thereto.

The skimmer assembly may further include: a screw skimmer positioned at a rear of the vacuum suction skimmer and rotatably provided with a screw member therein, thereby collecting the oil flowing onto the shore; and a second transfer pump configured to transfer oil and water recovered by the screw skimmer to the recovered oil treatment assembly or to the outside.

The oil collection assembly may include: a supporter provided on each of front opposite sides of the amphibious vehicle; a sweeping arm having one side hinge-coupled to one side of the supporter and an opposite side configured to be expandable and contractible in a front direction of the amphibious vehicle; a seawater supply pipe installed inside the sweeping arm along a longitudinal direction of the sweeping arm, and configured to receive the water supplied from the recovered oil treatment assembly, and then deliver the water to the sweeping arm; a plurality of spray nozzles installed at regular intervals on a surface of each of the sweeping arms, which face each other, and connected to the seawater supply pipe, thereby spraying the water received from the seawater supply pipe to the outside to induce oil, wherein a plurality of sweeping arms may be folded to each other to be brought into close contact with the supporter.

The recovered oil treatment assembly may include: a first oil storage tank configured to accommodate oil transferred from the first transfer pump or the skimmer conveyor; a second oil storage tank configured to accommodate oil and water recovered by the first transfer pump or the second transfer pump; an oil-water separator configured to separate water from the recovered oil by being connected to the second oil storage tank, and then discharge the separated water to the outside, and supply the separated oil to the first oil storage tank; and an oil recovery line connected between the oil-water separator and a lower portion of the first oil storage tank, and configured to transfer the oil separated from the oil-water separator to the first oil storage tank.

The system may further include a floating oil transfer line connected between upper portions of both the first oil storage tank and the second oil storage tank, and configured to transfer the oil floating on the upper portion of the second oil storage tank to the first oil storage tank.

The second transfer pump may include: a first transfer line having one end connected to the second transfer pump and an opposite end selectively connected to either the first oil storage tank or an external discharge hose extending from the outside; and a second transfer line having one end connected to the second transfer pump and an opposite end connected to the second oil storage tank.

An upper inlet through which solid oil and foreign substances transferred from the skimmer conveyor are introduced may be formed on a top portion of the first oil storage tank; and a mesh screen box having a form of a mesh net may be detachably provided on an inner upper side of the first oil storage tank, the inner upper side being faced to the upper inlet.

The system may further include a crane installed on one side of a top portion of the amphibious vehicle and configured to replaceably couple work tools and equipment for recovering oil to one end thereof.

Details of other embodiments are included in the detailed description and drawings.

As described above, according to a recovery system for large-scale spilled oil flowing onto and adhered to a shore according to an embodiment of the present disclosure, the recovery system is mounted on an amphibious vehicle capable of moving on the sea (a neritic zone, less than 1 m in depth) and land, and can remove and recover oil on the sea or flowing onto a shore and oil adhered to the shore while moving freely on the sea and land. Therefore, there are effects that it is possible to remove a large amount of the oil in a short time, it is possible to reduce time and cost required for an oil pollution control work, and the work can be done safely.

In addition, according to the recovery system for large-scale spilled oil flowing onto and adhered to a shore according to the embodiment of the present disclosure, the oil can be efficiently removed and recovered by selectively using the oil collection assembly, the brush skimmer of the skimmer assembly, the screw skimmer, or the like according to characteristics of the oil flowing onto and adhered to the shore, the working environment, and the like. Therefore, it is possible to efficiently perform the oil pollution control work.

In addition, according to the recovery system for large-scale spilled oil flowing onto and adhered to a shore of the embodiment of the present disclosure, the oil flowing onto the shore of spilled oil in the sea is primarily recovered through the skimmer assembly. Subsequently, the oil adhered to coastal sand or gravel is desorbed and then transferred to the first oil storage tank or the second oil storage tank. In this manner, the oil may be sequentially vacuumed up and recovered. Therefore, the oil can be removed in stages and recovered quickly, so the oil pollution control work can be performed more accurately.

In addition, according to the recovery system for large-scale spilled oil flowing onto and adhered to a shore of the embodiment of the present disclosure, by increasing the density of the oil dispersed on the seawater surface by the sweeping arms and the spray nozzles of the oil collection assembly, the oil recovery rate can be increased. In particular, it is possible to increase the oil recovery rate by moving the sweeping arms to collect the oil in the width direction and preventing the oil from being moved to portions out of the opposite ends of each of the sweeping arms through the spray nozzles. In addition, since the oil can be easily collected toward the skimmer assembly, oil collection efficiency can be further increased.

In addition, according to the recovery system for large-scale spilled oil flowing onto and adhered to a shore of the embodiment of the present disclosure, the recovered oil treatment assembly, in which the oil recovered from the skimmer assembly is accommodated and which is capable of storing the separated oil by separating water from the accommodated oil, is mounted on the amphibious vehicle, thereby allowing the recovered oil to be stored therein in an urgent situation so as to make emergency response possible. In addition, since a large amount of oil recovered and removed with the skimmer assembly can be stored directly in a separate loading vehicle without passing through an oil storage tank in the vehicle, a large amount of oil can be processed in a short time, so there is also a speediness and economical effect.

In addition, according to the recovery system for large-scale spilled oil flowing onto and adhered to a shore of the embodiment of the present disclosure, the water separated from oil by the oil-water separator can be supplied to the spray nozzles of the oil collection assembly. Therefore, it is not necessary to supply seawater and the like by additionally installing a pump and the like in order to supply water to the spray nozzles of the oil collection assembly, so there is an effect of not only reducing the number of parts, but also reducing cost and time.

Effects of the present disclosure are not limited to the effects mentioned above, and other effects not mentioned will be clearly understood by those skilled in the art from the description of the claims.

BRIEF DESCRIPTION OF THE DRAWINGS

The above and other aspects, features, and other advantages of the present disclosure will be more clearly understood from the following detailed description when taken in conjunction with the accompanying drawings.

DETAILED DESCRIPTION

Figure 1:
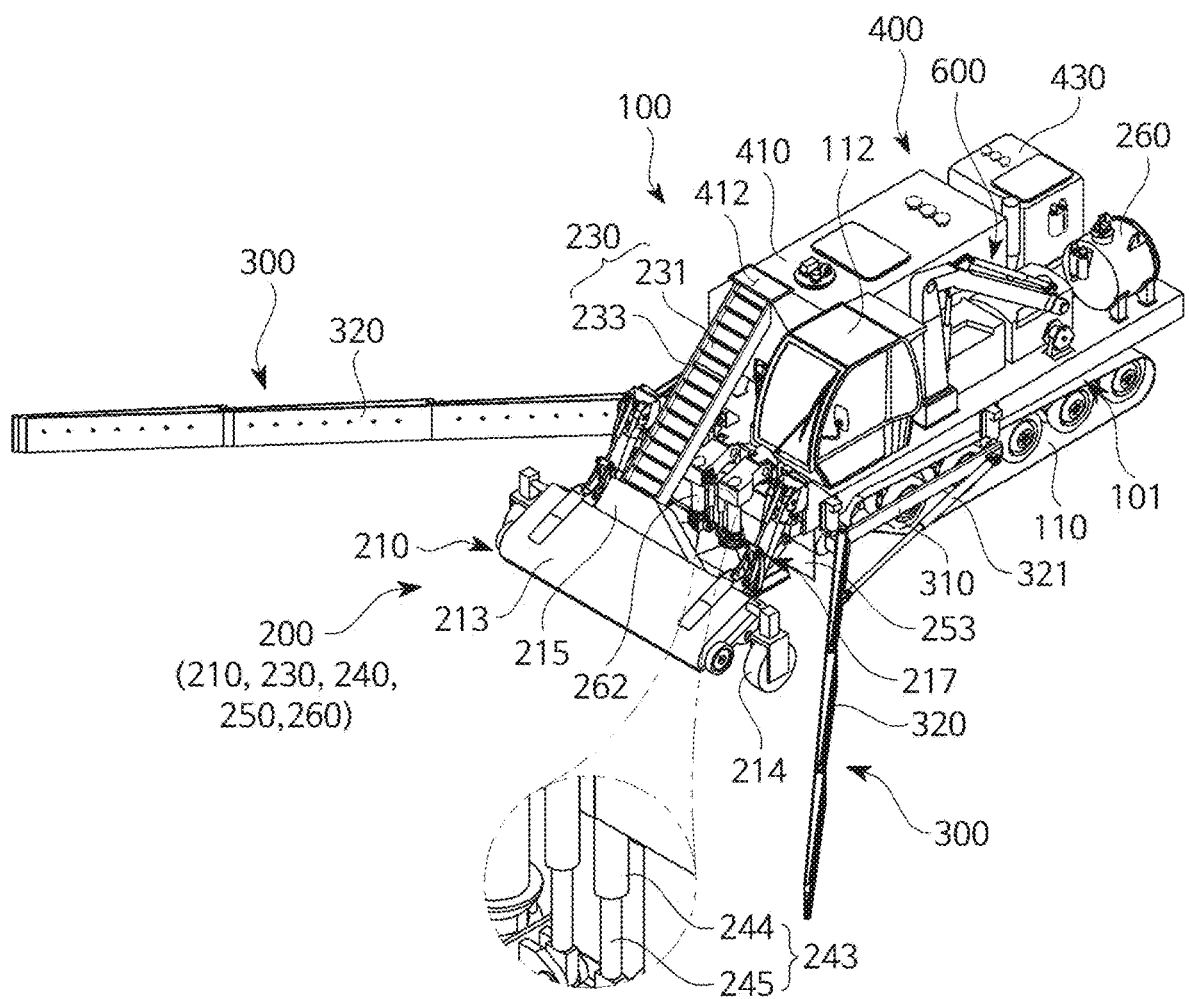
FIG. 1 is a perspective view showing a configuration of a recovery system for large-scale spilled oil flowing onto and adhered to a shore according to an embodiment of the present disclosure.

Hereinbelow, example embodiments of the present disclosure will be described in detail with reference to the accompanying drawings to an extent that those of ordinary skill in the art may easily implement the present disclosure.

In describing the embodiments, descriptions of technical contents that are well known in the technical field to which the present disclosure pertains and are not directly related to the present disclosure will be omitted. This is to more clearly convey the gist of the present disclosure without causing obfuscation by omitting unnecessary description.

For the same reason, some components in the accompanying drawings are exaggerated, omitted, or schematically illustrated. In addition, the size of each component does not fully reflect the actual size. The same reference numerals are assigned to the same or corresponding components in each drawing.

Various methods may be used for marine control of the spilled oil on the sea, such as methods using a control ship and an oil fence and methods using an adsorbent or a landing net.

However, the above methods of spilled oil control are mainly used on the sea, wherein, in a shallow neritic zone (less than 1 m in depth) or an area near the shore, the possibility of a secondary accident (stranding or overturning of the control ship) is high, thus making the work for spilled oil control very difficult and dangerous to perform.

In addition, in case of a large-scale spilled oil accident, it is inevitable that a large amount of spilled oil flows onto the shore and sticks on the shore because it is difficult to respond early to the accident due to restricting factors such as bad weather and the like.

On the other hand, in an event of a spilled oil accident on the sea, the oil floating on the sea is prevented from being spread or is partially recovered by using a marine control ship, absorbent, a landing net, or the like. However, in spite of a marine pollution control work of spilled oil on the sea, 70% of the spilled oil still flows onto a shore and is left unprotected in a defenseless state for a long time of period. Accordingly, such damage is emerging as a very big issue.

However, typical equipment or tools were not capable of removing a large amount of oil flowing onto the shore or oil adhered to sand or gravel or of removing and recovering oil by separating only the oil from the oil and seawater. Therefore, a recovery rate was very low, because most of the oil was removed by primitive control methods such as scooping up by labor, or rocky cleaning work using oil absorbents, or the like. Furthermore, as workers stepped on the oil or the removal work elapsed for a long time, the oil adhered to the shore penetrated more into the ground, increasing environmental pollution and taking a long time to remove and restore. As a result, the marine pollution control work of the spilled oil may be costly. In addition, such work may adversely affect health of working people such as local residents and volunteers who participated in a coastal pollution control work.

Accordingly, there is a need for a device or a method that is capable of not only saving time and money but also quickly performing on a large-scale for removing the oil flowing onto or adhered to the shore due to the spilled oil accident.

FIG. 1 is a perspective view showing a configuration of a recovery system for large-scale spilled oil flowing onto and adhered to a shore according to an embodiment of the present disclosure.

As shown in FIG. 1, the large-scale recovery system 100 for oil flowing onto and adhered to the shore is mounted on an amphibious vehicle 101. In the present embodiment, the amphibious vehicle 101 is capable of moving on the sea (less than 1 m in depth in the present embodiment) and on land, and when moving on the sea, it is moved by the thrust of a propeller, and when moving on land, it is moved by the driving force of a caterpillar track 110.

The amphibious vehicle 101 is able to move even in a soft ground, for example, mudflats, a beach, or the like by the caterpillar track 110. In addition, the oil may be easily removed and recovered using the amphibious vehicle 101 even at a low draft level where depth of draft is about 50 cm.

As shown in FIG. 1, a skimmer assembly 200 is provided in the large-scale recovery system 100 for oil flowing onto and adhered to the shore. At this time, the skimmer assembly 200 is provided in a front of the amphibious vehicle 101. Here, the skimmer assembly 200 serves to desorb oil adhered to surfaces of coastal sand or gravel and to vacuum and recover oil flowing onto the shore.

In the present embodiment, the skimmer assembly 200 may be provided with a brush skimmer 210 and a skimmer conveyor 230.

The brush skimmer 210 serves to desorb oil, tar lumps, other foreign substances, and the like adhered to surfaces of coastal sand, gravel, or the like. Here, the brush skimmer 210 may be provided with a rotation roller 211, a cover plate 213, a guide plate 215, and a connection arm 217.

Figure 3:
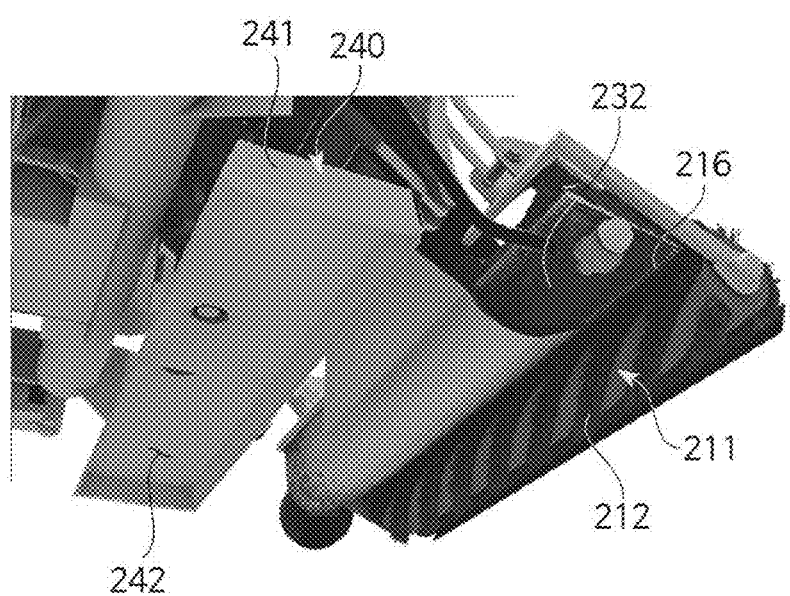
FIG. 3 is a perspective view showing a partial configuration of a skimmer assembly according to the embodiment of the present disclosure.

As shown in FIG. 3, the rotation roller 211 is a cylindrical shape having a predetermined length and is rotatably provided in a horizontal direction with respect to the ground. Opposite ends of the rotation roller 211 are rotatably connected to the cover plate 213 to be described below.

A brush 212 may be provided in a spiral shape along a longitudinal direction of the rotation roller 211 on an outer surface of the rotation roller 211. This is to allow the oil removed from the brush 212 to be moved in a direction to the guide plate 215.

The brush 212 serves to desorb oil floating on a water surface or to scrape and desorb oil, tar lumps, other foreign substances, and the like adhered to surfaces of coastal sand, gravel, or the like. In the present embodiment, the brush 212 may be made of a fiber bundle of a lipophilic material. This is to ensure that the oil is effectively adhered to the brush 212.

Figure 4:
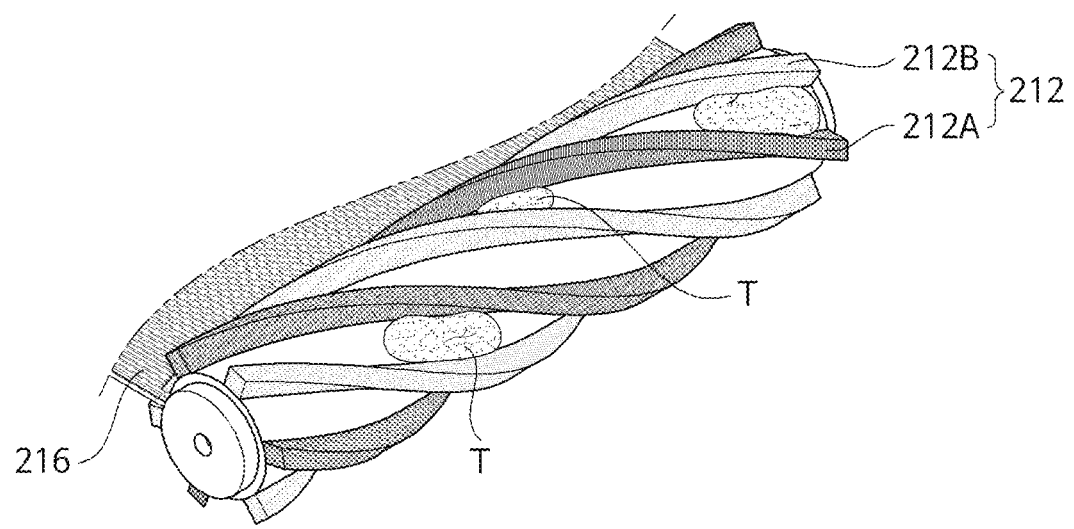
FIG. 4 is a schematic perspective view showing a partial configuration of a brush skimmer according to the embodiment of the present disclosure.

As shown in FIG. 4, the brush 212 may be composed of a pair of a first brush 212A and a second brush 212B, which are made of different materials from each other. In the present embodiment, the first brush 212A may be made of a harder material than the second brush 212B, and the second brush 212B may be made of a softer material than the first brush 212A. This is to scrape and desorb fixed oil lumps, other foreign substances, and the like with the first brush 212A, and to sweep and collect the removed materials with the second brush 212B.

In the present embodiment, the first brush 212A and the second brush 212B are provided in three pairs and disposed to be spaced apart from each other at a predetermined interval. In this case, the first brush 212A and the second brush 212B may extend in a spiral shape on the outer surface of the rotation roller 211 along the longitudinal direction of the rotation roller 211.

In addition, the first brush 212A and the second brush 212B may be formed by being spaced apart from each other at a predetermined distance. This is to allow foreign substances such as garbage T to be inserted between the first brush 212A and the second brush 212B, thereby being collected. At this time, the collected garbage T and the like may be desorbed and removed by a scraper 216 to be described below.

A top portion of the rotation roller 211 is shielded by the cover plate 213. Here, opposite sides of the cover plate 213 are rotatably connected to the opposite ends of the rotation roller 211, respectively.

In the present embodiment, guide wheels 214 may be provided on the opposite sides of the cover plate 213, respectively. The guide wheel 214 is a part for smoothly moving the brush skimmer 210 in the same direction as the moving direction of the amphibious vehicle 101.

The guide plate 215 is extendedly formed to from one side of the cover plate 213 toward the skimmer conveyor 230. Here, the guide plate 215 is formed to gradually decrease in width toward the skimmer conveyor 230. This is to guide the oil removed from the brush 212 to the skimmer conveyor 230.

As shown in FIG. 3, the scraper 216 may be provided in a direction parallel to the rotation roller 211 at an inner side of the cover plate 213. One side of the scraper 216 may be formed in a saw blade shape, the side in a direction facing the rotation roller 211. The scraper 216 is for scraping and desorbing solid oil, tar lumps, marine garbage, other foreign substances, and the like adhered to the brush 212. The oil, tar lumps, marine garbage, other foreign substances, and the like desorbed from the scraper 216 may be moved to the skimmer conveyor 230 by a guide screw 224 to be described below.

In the present embodiment, a plurality of the scrapers 216, each having a blade shape, may be configured to be spaced apart at a predetermined interval. This is to allow oil having low-viscosity and water to be discharged between the scrapers 216 to the lower portion. The scraper 216 may be made of a polypropylene (PP) material that is resistant to corrosion and deformation.

Meanwhile, as shown in FIG. 1, the connection arms 217 may be provided in a direction parallel to each other in the front of the amphibious vehicle 101. One side of each of the connection arms 217 is hinge-coupled to the front of the amphibious vehicle 101, and an opposite side is connected to the cover plate 213. Accordingly, a position of the rotation roller 211 may be varied according to the operation of the connection arm 217.

Figure 5:
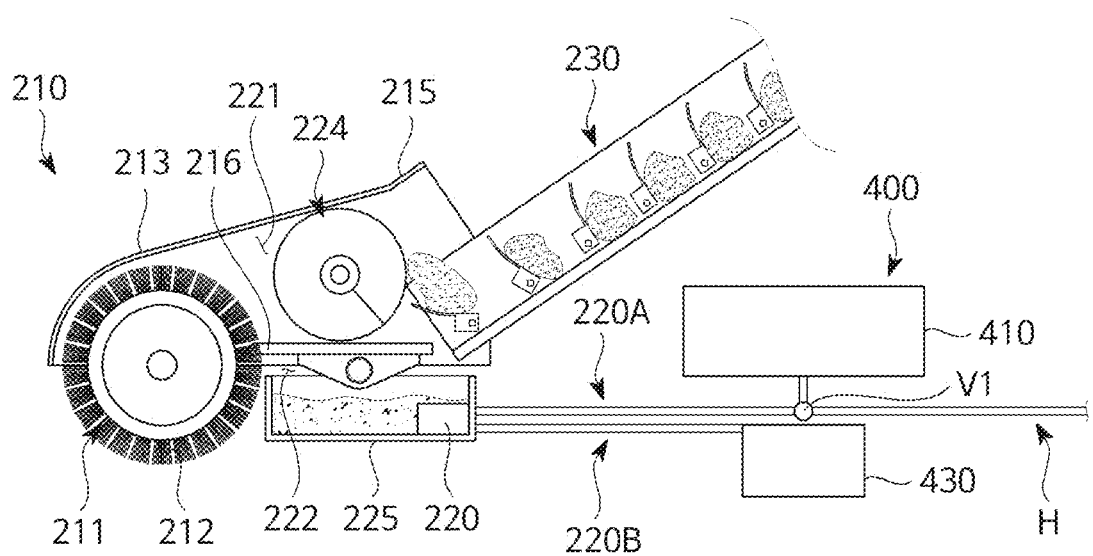
FIG. 5 is a schematic view showing a configuration of the skimmer assembly and a recovered oil treatment assembly according to the embodiment of the present disclosure.

Meanwhile, as shown in FIG. 5, a first transfer pump 220 is positioned below the scraper 216. The first transfer pump 220 serves to transfer oil and water dropped from a bottom portion of the scraper 216 to a recovered oil treatment assembly 400 or to the outside, for example, an external discharge hose H. At this time, the oil dropped from the bottom portion of the scraper 216 is oil of relatively low viscosity, and the water is seawater.

The first transfer pump 220 serves to transfer the oil and water dropped from the bottom portion of the scraper 216 to the recovered oil treatment assembly 400 or to the outside. In the present embodiment, as shown in FIG. 5, the first transfer pump 220 may include a first transfer line 220A and a second transfer line 220B. This is to allow the oil to be directly transferred to the outside without going through the recovered oil treatment assembly 400 when an amount of the oil to be removed and recovered through the first transfer pump 220 is large.

One end of the first transfer line 220A is connected to the first transfer pump 220, and an opposite end of the first transfer line 220A may be selectively connected to a first oil storage tank 410 to be described below or to an external discharge hose H delivered from the outside. Here, the external discharge hose H is a hose connected to an oil recovery tank 500 to be described below but is not necessarily limited thereto. For example, the external discharge hose may be a hose connected to a separate loading vehicle. To this end, a valve V1 is installed at the end of the first transfer line 220A, and the valve V1 is controlled, whereby the oil passing through the first transfer line 220A may be discharged to the outside through the external discharge hose H or may be moved to the first oil storage tank 410.

One end of the second transfer line 220B may be connected to the first transfer pump 220, and an opposite end of the second transfer line 220B may be connected to a second oil storage tank 430 to be described below. In embodiments, the second transfer line 220B serves as a passage for guiding oil, water, and the like to be moved to the second oil storage tank 430. In the present embodiment, a control valve may be connected to one end of the second transfer line 220B, so that the second transfer line (220B) may be opened or closed according to a type of oil, for example, high viscosity oil or low viscosity oil, which is to be removed and recovered.

Meanwhile, in the present embodiment, as shown in FIG. 5, an inner space of the cover plate 213 may be partitioned onto an upper space 221 and a lower space 222 by the scraper 216.

A guide screw 224 may be positioned in the upper space 221. Here, the guide screw 224 is rotatably provided at an inner side the cover plate 213. In addition, the guide screw 224 is substantially a spiral shape and may be extendedly formed in a direction parallel to the rotation roller 211. Here, the guide screw 224 serves to transfer the solid oil, marine garbage, other foreign substances, and the like desorbed by the scraper 216 to the guide plate 215. In this way, the solid oil, marine garbage, other foreign substances, and the like moved to the guide plate 215 are transferred to the first oil storage tank 410 along the skimmer conveyor 230.

As shown in FIG. 5, an oil accommodation vessel 225 may be positioned below the scraper 216. In the present embodiment, the oil accommodation vessel 225 is a part accommodating oil dropped from the bottom portion of the scraper 216, for example, oil, water, and the like dropped by compression between the scraper 216 and the brush 212. In addition, the first transfer pump 220 is disposed inside the oil accommodation vessel 225. Accordingly, the first transfer pump 220 may transfer the oil and water in the oil accommodation vessel 225 to the recovered oil treatment assembly 400 or to the outside.

Meanwhile, as shown in FIG. 1, the skimmer conveyor 230 serves to transfer the solid oil, marine garbage, other foreign substances, and the like desorbed from the brush skimmer 210 to the first oil storage tank 410 of the recovered oil treatment assembly 400 to be described below. Here, the skimmer conveyor 230 may be composed of a belt part 231 and a transfer plate 233.

One side of the belt part 231 is positioned toward the rotation roller 211, and an opposite side of same is connected to the recovered oil treatment assembly 400. Accordingly, while circulating between the rotation roller 211 and the recovered oil treatment assembly 400, the belt part 231 serves to transfer the oil received from the rotation roller 211 to the recovered oil treatment assembly 400.

In the present embodiment, the belt part 231 is configured to be able to rotate together in a state of surrounding the front roller 232 rotatably positioned below the cover plate 213 and the rear roller positioned in the amphibious vehicle 101. In the present embodiment, the belt part 231 may be made of a fiber made of a lipophilic material, e.g., synthetic fiber such as polyester, polypropylene, or the like, or nonwoven fabric having porosity using a natural material such as sawdust, wool, bark, and the like.

As shown in FIG. 1, a transfer plate 233 is extendedly formed in a direction orthogonal to an outer surface of the belt part 231. A plurality of transfer plates 233 may be disposed on the outer surface of the belt part 231 at regular intervals. The transfer plate 233 serves to support the solid oil, marine garbage, other foreign substances, and the like transferred through the belt part 231.

In the present embodiment, one end of the transfer plate 233 may be hinge-coupled to the belt part 231 and an opposite end of same may be a free end. When provided as above, the transfer plate 233 may rotate so that the opposite end thereof is brought to a position adjacent to the guide screw 224, thereby easily receiving the solid oil, marine garbage, other foreign substances, and the like. After receiving the solid oil, marine garbage, other foreign substances, and the like, the transfer plate 233 may support the solid oil, marine garbage, other foreign substances, and the like by being rotated in a shape being orthogonal from the outer surface of the belt part 231.

In the present embodiment, a lower end of the skimmer conveyor 230 may be provided to be expandable and contractible in a telescopic way. Here, the lower end of the skimmer conveyor 230 may be operated by being interlocked with the brush skimmer 210. In embodiments, the lower end of the skimmer conveyor 230 may expand and contract according to the up-and-down movement of the brush skimmer 210.

Meanwhile, as shown in FIG. 1, a vacuum suction skimmer 240 and a vacuum tank 260 may be provided in the skimmer assembly 200. The vacuum suction skimmer 240 may be more effectively used when recovering the floating oil, oil lumps, oil accumulated on a beach, and the like on a large scale.

Figure 2:
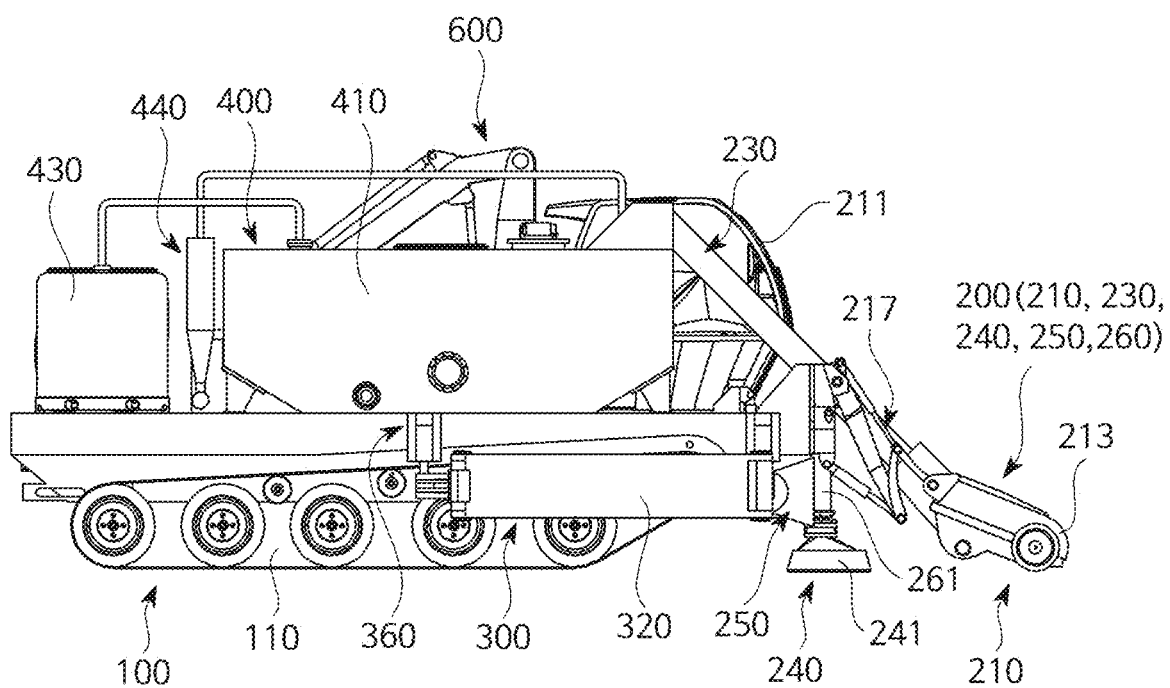
FIG. 2 is a side view showing the configuration of the recovery system for large-scale spilled oil flowing onto and adhered to a shore according to the embodiment of the present disclosure.

As shown in FIGS. 1 to 3, a suction plate 241 is provided in the vacuum suction skimmer 240. The suction plate 241 may be extendedly formed in order to have a width corresponding to that of the amphibious vehicle 101.

As shown in FIG. 3, a suction space 242 may be formed in the suction plate 241. Here, the suction space 242 may be formed to have one side being open toward a bottom side and to be tapered in a direction that width is gradually narrowed as approaching an upper part. This is to facilitate oil or the like to be easily vacuumed up along an inner surface of the suction space 242.

A mesh net may be installed at an inlet of the suction space 242. Here, the mesh net is in a form of a mesh and is to prevent foreign substances, which have a diameter larger than a diameter of a connection pipe connecting the vacuum suction skimmer 240 and the vacuum tank 260, from passing therethrough.

An up-and-down movement member 243 is provided in the vacuum suction skimmer 240. One side of the up-and-down movement member 243 is connected to the suction plate 241 and an opposite side of same is connected to the amphibious vehicle 101. Here, the up-and-down movement member 243 serves to move the suction plate 241 in an up-and-down direction.

In the present embodiment, the up-and-down movement member 243 may be composed of a cylinder 244 and a piston 245. The cylinder 244 is connected to a front lower portion of the amphibious vehicle 101. Here, the cylinders 244 may be configured in a pair.

One side of the piston 245 is connected to a top portion of the suction plate 241, and an opposite side of same is installed to be movable up and down inside the cylinder 244. Accordingly, a distance at which the suction plate 241 is separated from the ground or the water surface may vary depending on the length of the piston 245 exposed from the cylinder 244.

The vacuum tank 260 may transmit vacuum suction force to the vacuum suction skimmer 240, thereby vacuuming up adhered oil, accumulated oil, high viscosity oil, and the like. At the same time, the vacuum tank 260 may discharge the adhered oil, low viscosity oil, high viscosity oil, and the like, which have been vacuumed up, to the outside, for example, a separate loading vehicle or the first oil storage tank 410. To this end, a motor, an electric box, and the like may be installed in the vacuum tank 260, and the external discharge hose H connected to the outside may be connected to the vacuum tank 260.

A vacuum suction pipe 261 communicating with the suction space 242 is connected to the vacuum tank 260. In embodiments, one end of the vacuum suction pipe 261 is communicated with the suction space 242 and an opposite end of same is connected to the vacuum tank 260.

Figure 9:
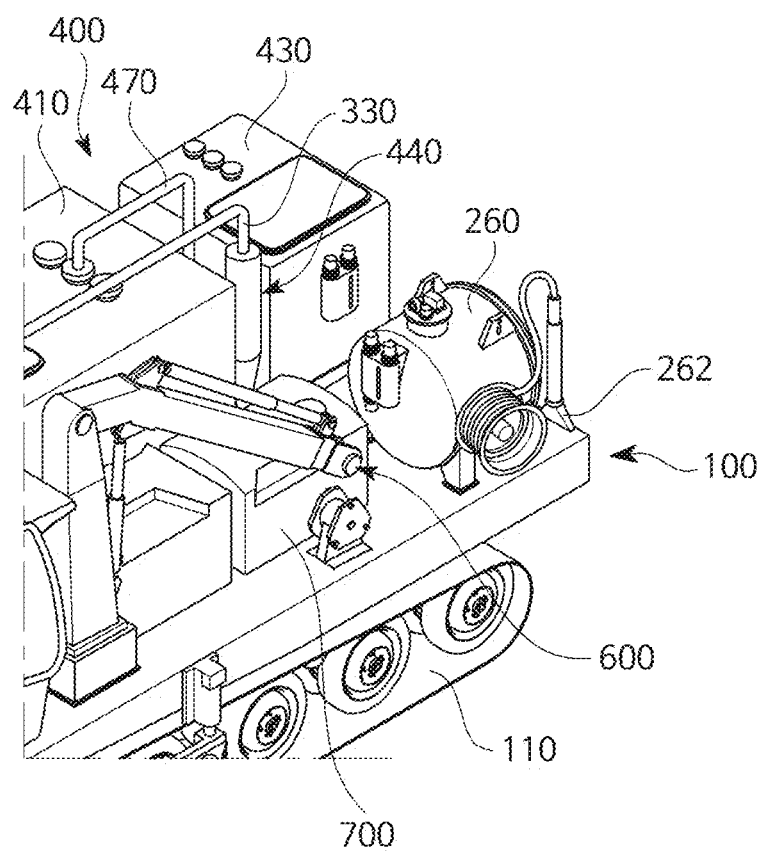
FIG. 9 is a perspective view showing a partial configuration of the recovered oil treatment assembly according to the embodiment of the present disclosure.

As shown in FIG. 9, a portable nozzle 262 may be connected to the vacuum tank 260. The portable nozzle 262 is directly gripped and used by a user and is to vacuum up and remove oil in a location such as a narrow space that the vacuum suction skimmer 240 does not reach or rocks and the like that the amphibious vehicle 101 has difficulty moving on.

Meanwhile, a screw skimmer 250 and a second transfer pump 252 may be provided in the skimmer assembly 200. As shown in FIG. 2, the screw skimmer 250 may be positioned at a rear portion of the vacuum suction skimmer 240. Here, the screw skimmer 250 serves to recover oil flowing onto the shore along the movement of the amphibious vehicle 101.

Figure 6:
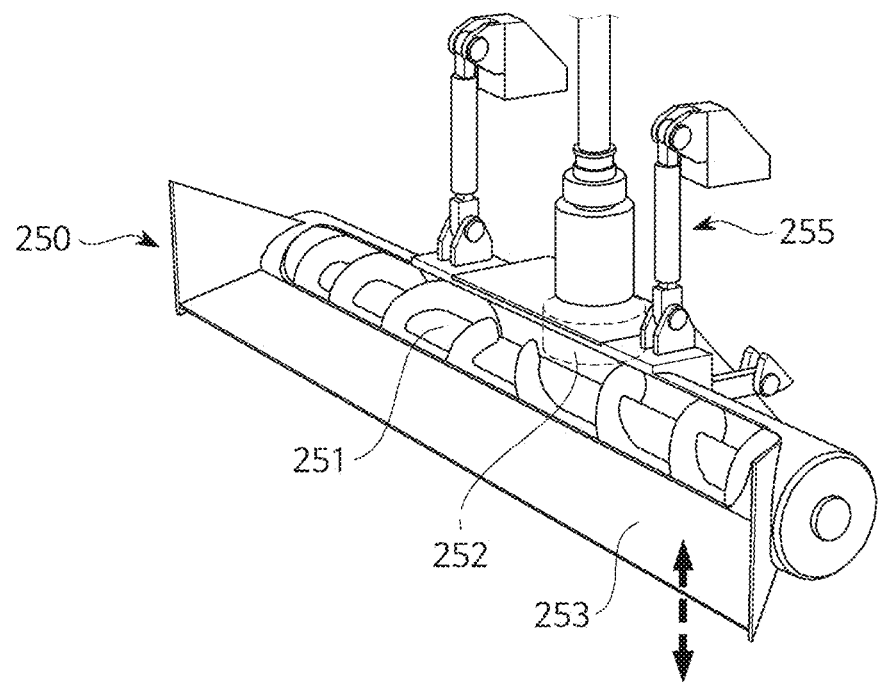
FIG. 6 is a perspective view showing a configuration of the screw skimmer according to the embodiment of the present disclosure.

As shown in FIG. 6, a screw member 251 is rotatably installed in the screw skimmer 250. The screw member 251 is rotatably provided in a horizontal direction with the ground. The screw member 251 has an outer surface of a screw shape, and the oil, foreign substances, and the like may be easily collected along an outer surface of the screw member 251.

As shown in FIG. 6, an inlet 253 is formed in the screw skimmer 250. The inlet 253 is formed to have one side open toward the front. The inlet 253 may be formed such that the width thereof increases in a direction toward the outside from the screw member 251. This is to easily guide the movement of the oil flowing onto the inlet 253.

In the present embodiment, the lower portion of the inlet 253 may be provided to be level adjustable according to thickness of an oil film. For example, when the thickness of the oil film is thick, the inlet 253 may move in a state of the lower portion thereof being downward so that more oil is to be introduced toward the screw member 251.

As shown in FIG. 6, a position controller 255 is installed to be movable up and down between the inlet 253 and the amphibious vehicle 101. The position controller 255 is a part moving up and down to allow the inlet 253 to adjust the level thereof according to the thickness of the oil layer. The operation of the position controller 255 may be controlled by a controller C. In the present embodiment, the position controller 255 may be composed of a cylinder and a piston.

Figure 10:
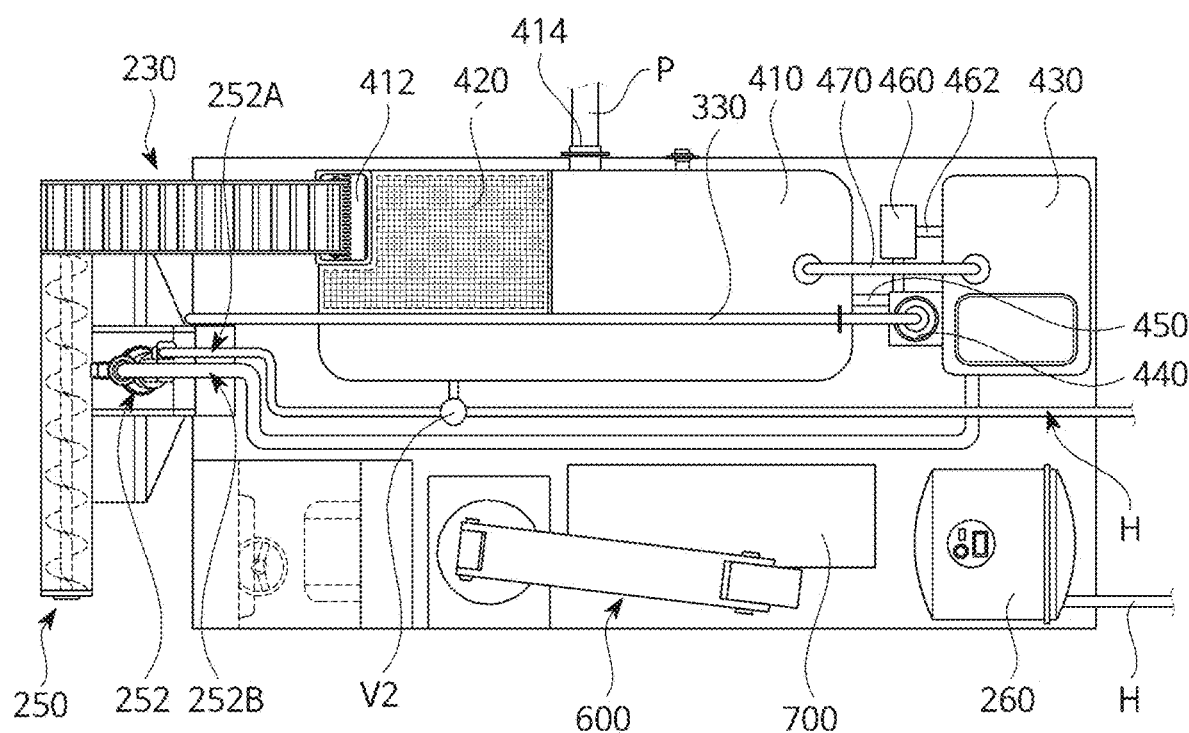
FIG. 10 is a schematic sectional view showing the configuration of the recovered oil treatment assembly according to the embodiment of the present disclosure.
Figure 11:
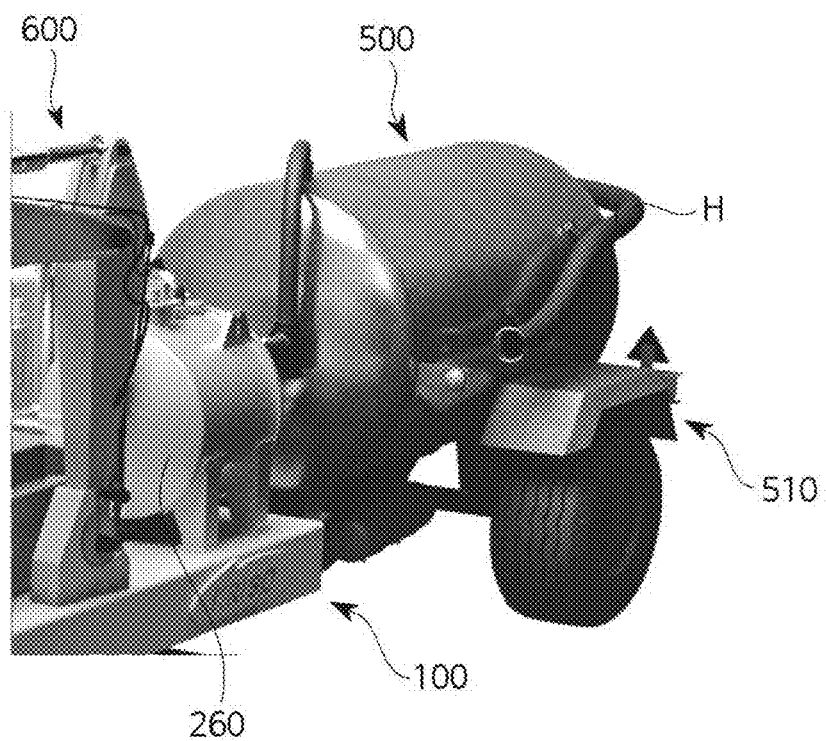
FIG. 11 is a perspective view showing a partial configuration of the recovery system for large-scale spilled oil flowing onto and adhered to a shore according to the embodiment of the present disclosure.

The second transfer pump 252 serves to transfer the oil and water recovered from the screw skimmer 250 to the recovered oil treatment assembly 400 or to the outside. In the present embodiment, as shown in FIG. 10, the second transfer pump 252 may include a first transfer line 252A and a second transfer line 252B.

One end of the first transfer line 252A may be connected to the second transfer pump 252, and an opposite end of same may be selectively connected to the first oil storage tank 410 to be described below or the external discharge hose H delivered from the outside. In embodiments, through the first transfer line 252A, adhered oil, low viscosity oil, high viscosity oil, and the like may be discharged to the outside through the external discharge hose H or may be moved to the first oil storage tank 410.

One end of the second transfer line 252B may be connected to the second transfer pump 252, and an opposite end of same may be connected to the second oil storage tank 430 to be described below. In embodiments, the second transfer line 252B serves as a passage for guiding floating oil, for example, oil floating on the shore, seawater, and the like to be moved to the second oil storage tank 430.

Figure 7:
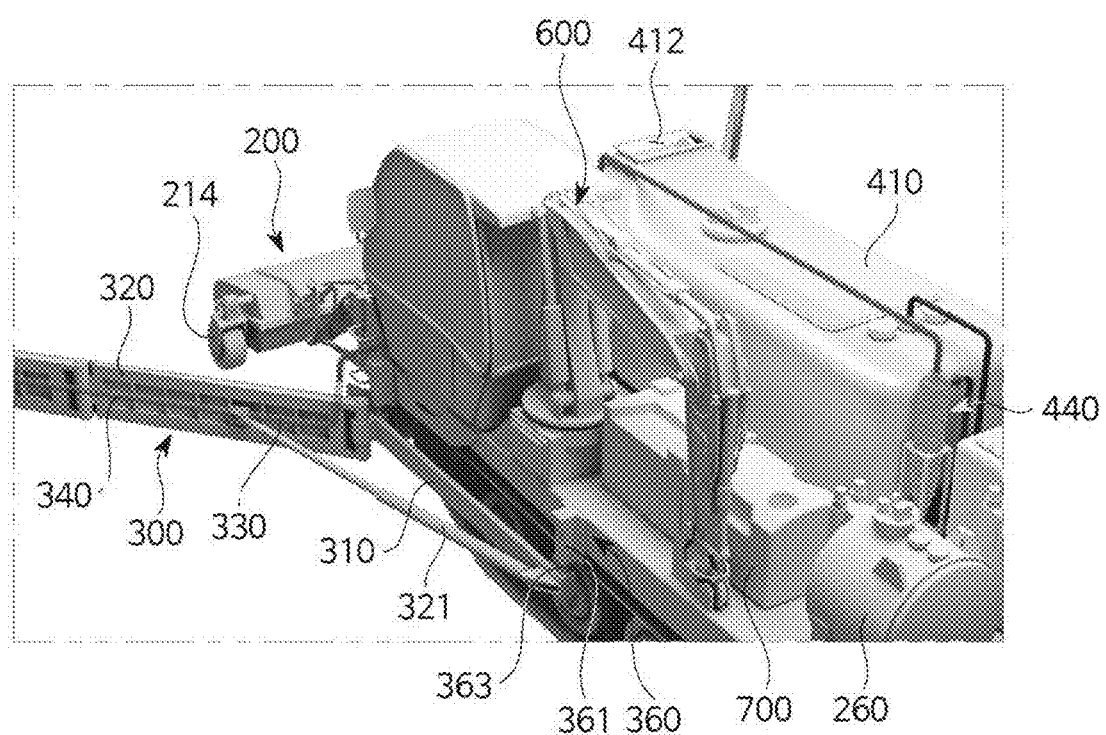
FIG. 7 is a perspective view showing a partial configuration of the recovery system for large-scale spilled oil flowing onto and adhered to a shore according to the embodiment of the present disclosure.
Figure 8:
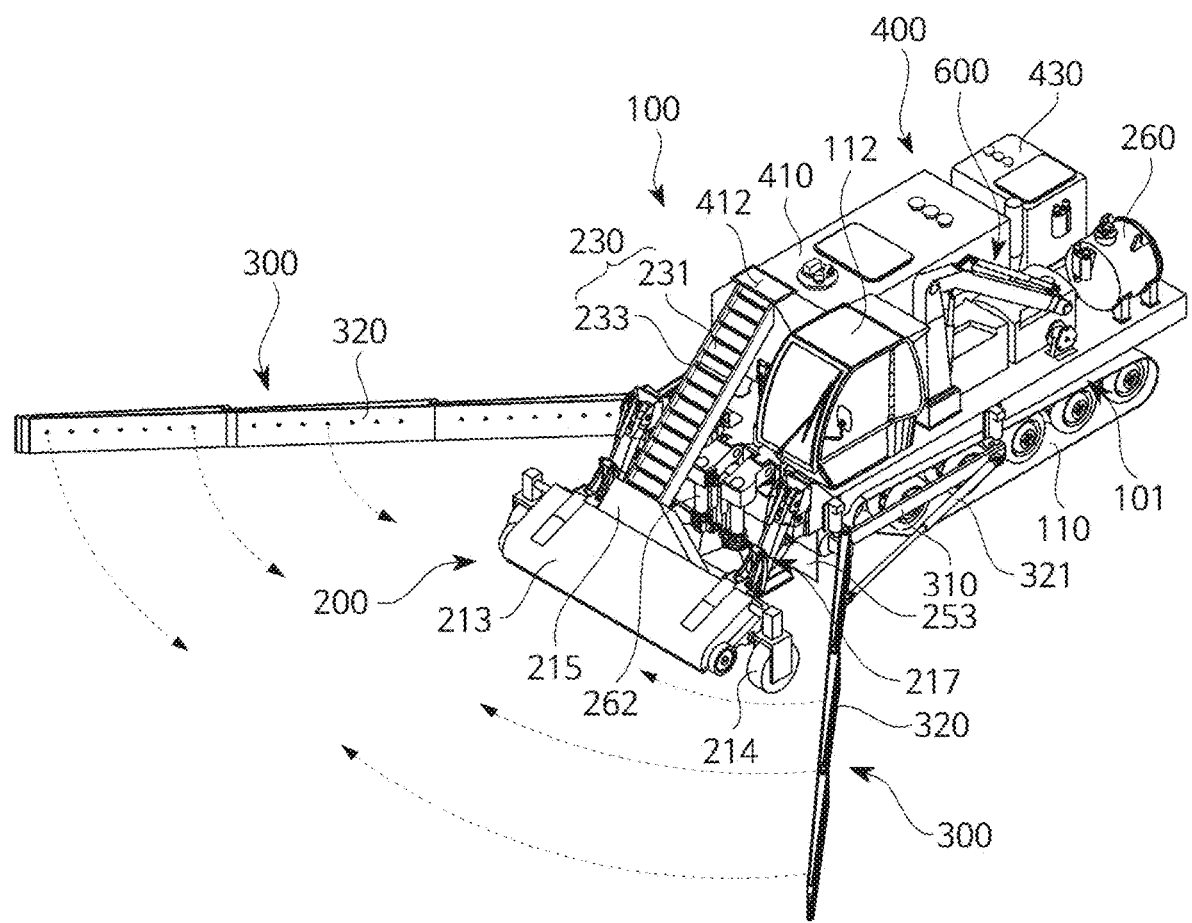
FIG. 8 is a schematic view showing a partial configuration of the recovery system for large-scale spilled oil flowing onto and adhered to a shore according to the embodiment of the present disclosure.

Meanwhile, as shown in FIGS. 1, 7, and 8, an oil collection assembly 300 may be provided in the recovery system for large-scale spilled oil flowing onto and adhered to a shore. In the present embodiment, the oil collection assembly 300 is foldably provided on each of front opposite sides of the amphibious vehicle 101. The oil collection assembly 300 serves to collect oil, floating on a seawater surface, toward the amphibious vehicle 101.

As shown in FIGS. 7 and 8, the oil collection assembly 300 may include a supporter 310, a sweeping arm 320, a seawater supply pipe 330, a spray nozzle 340, and an elevating member 360.

The supporter 310 is provided on each of front opposite sides of the amphibious vehicle 101. The supporter 310 is formed to extend long in a longitudinal direction of the amphibious vehicle 101. The supporter 310 serves to prop the sweeping arm 320.

As shown in FIGS. 7 and 8, one side of the sweeping arm 320 may be hinge-coupled to one side of the supporter 310, and an opposite side of same may be formed to be expandable and contractible toward the front of the amphibious vehicle 101. In addition, the sweeping arms 320 may be rotated in a direction in which a distance therebetween increases as approaching from the one side to the opposite side. Here, the sweeping arms 320 serve to collect oil.

In the present embodiment, as shown in FIGS. 1 and 2, a plurality of sweeping arms 320 may be folded to each other to be in close contact with an outer surface of the supporter 310. When provided as above, it is because a volume of the oil collection assembly 300 may be minimized. To this end, opposite sides of the sweeping arms 320 may be hinge-coupled to each other by hinge pins.

An interlocking member 321 may be provided between an opposite side of the supporter 310 and the sweeping arm 320. The interlocking member 321 has a multistage rod shape having a telescopic structure and serves to move the sweeping arm 320 in a direction in which the sweeping arm 320 approaches or goes away from the supporter 310.

As shown in FIG. 7, the seawater supply pipe 330 may be installed inside the sweeping arm 320. The seawater supply pipe 330 serves to receive water supplied from the recovered oil treatment assembly 400 and to deliver the water to the spray nozzles 340 to be described below.

As shown in FIG. 8, the spray nozzles 340 may be installed on one surface of each of the sweeping arms 320 facing each other. The spray nozzles 340 are installed on the sweeping arm 320 at regular intervals. The spray nozzles 340 are connected to the seawater supply pipe 330 and serve to spray water received from the seawater supply pipe 330 to the outside. When configured as above, it is possible to induce oil to be collected in an inner side between the opposite sweeping arms 320 by water sprayed through the spray nozzles 340.

In embodiments, an oil recovery rate may be increased by increasing a density of the oil dispersed on the seawater surface by the sweeping arms 320 and the spray nozzles 340. In particular, the oil is collected in a width direction by moving the sweeping arms 320, and the oil is prevented from being moved to a portion out of the opposite end of each of the sweeping arms 320 by water sprayed through the spray nozzles 340, whereby the recovery rate of oil may be increased. In addition, since the oil may be collected toward the skimmer assembly 200, oil collection efficiency may be further increased.

In embodiments, the spray nozzles 340 each may be installed to be angle adjustable. For example, the spray nozzles 340 may be formed in an articulated tube shape.

As shown in FIG. 7, the supporter 310 may be moved in an up and down direction by a pair of elevating members 360. In embodiments, one side of the elevating member 360 may be connected to each of the opposite ends of the supporter 310, and an opposite side of each of the pair of elevating members 360 may be connected to the amphibious vehicle 101, thereby moving the supporter 310 in an up-and-down direction.

In the present embodiment, the elevating member 360 may be composed of an elevating cylinder 361 and an extender 363. The elevating cylinder 361 is installed at each of positions of the amphibious vehicle 101, the positions corresponding to the opposite ends of the supporter 310. In addition, one side of the extender 363 is connected to each of the opposite ends of the supporter 310, and an opposite side of same is installed inside each of the elevating cylinders 361 to be movable up and down. The elevating members 360 adjust the up-and-down positions of the supporter 310 and the sweeping arm 320 connected to the supporter 310 according to the density of the oil, thereby allowing the oil collection efficiency to be further increased.

Meanwhile, as shown in FIGS. 8 and 9, the recovered oil treatment assembly 400 is provided in the recovery system for large-scale spilled oil flowing onto and adhered to a shore. In the present embodiment, the recovered oil treatment assembly 400 serves to selectively accommodate the oil recovered from the skimmer assembly 200, to separate water from the accommodated oil to store the separated oil, to supply the water separated from the oil to the oil collection assembly 300, and the like.

Here, a reason why the recovered oil treatment assembly 400 selectively accommodates the oil recovered from the skimmer assembly 200 is that when an amount of oil, which the first transfer pump 220 and the second transfer pump 252 recover, is large, the recovered oil is transferred directly to the outside, for example, through the external discharge hose H without being accommodated in the recovered oil treatment assembly 400.

In the present embodiment, the recovered oil treatment assembly 400 may include the first oil storage tank 410, the second oil storage tank 430, an oil-water separator 440, an oil recovery line 450, a supply pump 460, and a floating oil transfer line 470.

The first oil storage tank 410 is a part in which oil recovered from the first transfer pump 220 and the skimmer conveyor 230 is accommodated. In addition, oil recovered from the first transfer line 252A of the second transfer pump 252 may also be accommodated in the first oil storage tank 410.

A top inlet 412 may be formed at a top portion of the first oil storage tank 410. The top inlet 412 serves as an entrance through which the oil delivered from the skimmer conveyor 230 flows.

As shown in FIG. 10, a mesh screen box 420 may be detachably provided on an inner upper side of the first oil storage tank 410, wherein the inner upper side faces the upper inlet. The mesh screen box 420 is manufactured as a box in the form of a mesh net and serves to primarily filter out bulky tar lumps, other foreign substances, and the like among the oil delivered from the skimmer conveyor 230.

In the present embodiment, since the mesh screen box 420 is detachably provided, when the mesh screen box 420 is filled to the full with tar lumps, other foreign substances, and the like, by using a crane 600, to be described below, and the like, the mesh screen box 420 may be moved to the outside and contents therein may be emptied, and then the empty mesh screen box 420 may be installed again on the inner upper side of the first oil storage tank 410. To this end, a guide rib may be protrudingly provided at an outer bottom portion of the mesh screen box 420, and a support rib on which the guide rib may be hooked and supported may be formed inside the first oil storage tank 410.

An inlet is formed at one side of the first oil storage tank 410. Here, the inlet serves as an entrance through which oil delivered from the vacuum tank 260 is introduced.

An outlet 414 may be formed at an opposite side of the first oil storage tank 410. The oil, foreign substances, and the like stored in the first oil storage tank 410 may be discharged to the outside through the outlet 414. The outlet 414 may be connected to an external discharge pipe P of a separate loading vehicle to be described below or the external discharge hose H.

The second oil storage tank 430 is a part in which the oil and water recovered from the second transfer line 252B of the second transfer pump 252 are accommodated. The second oil storage tank 430 is a part in which the floating oil and the seawater that is vacuumed up when the floating oil is vacuumed up are accommodated, and the oil having a relatively lower viscosity than the oil stored in the first oil storage tank 410 may be stored.

The oil-water separator 440 is connected to the second oil storage tank 430. The oil-water separator 440 serves to separate water from the recovered oil by being connected to the second oil storage tank 430. In embodiments, the oil-water separator 440 is a device that separates a mixture of recovered oil and water, thereby collecting the oil separately, and the oil and water are separated by a gravity method mainly using a density difference or by centrifugation. In the present embodiment, it may be separated by the centrifugation.

The oil-water separator 440 and a lower portion of the first oil storage tank 410 may be connected by the oil recovery line 450. Here, the oil recovery line 450 serves to transfer the oil separated from the oil-water separator 440 to the first oil storage tank 410 therethrough.

In the present embodiment, the second oil storage tank 430 and the oil-water separator 440 may be connected to each other by a supply line 462 installed therebetween and provided in the supply pump 460. A mixture of oil and water is moved from the second oil storage tank 430 to the oil-water separator 440 through the supply line 462 by driving of the supply pump 460.

As shown in FIG. 9, the oil-water separator 440 may be connected to the seawater supply pipe 330. Then, the water separated from the oil-water separator 440 is moved to the seawater supply pipe 330. Therefore, since water may be supplied from the oil-water separator 440 even without mounting a separate water tank for the oil collection assembly 300, not only the number of parts but also even cost and time may be reduced.

Meanwhile, a sensing unit may be provided on an upper inner wall of each of the first oil storage tank 410 and the second oil storage tank 430. The sensing unit is to detect a level of oil, which is accommodated inside each of the first oil storage tank 410 and the second oil storage tank 430, and water being accommodated together with the oil.

A level value detected by the sensing unit may be transmitted to the controller C. In this case, the controller C may compare a preset value with the level value transmitted from the sensing unit and may stop the operation of the skimmer assembly 200 when the level value is no less than the preset value.

As shown in FIG. 10, the floating oil transfer line 470 is positioned between each of upper portions of both the first oil storage tank 410 and the second oil storage tank 430. The floating oil transfer line 470 connects each of the upper portions of both the first oil storage tank 410 and the second oil storage tank 430, thereby serving as a passage to guide the oil floating on the upper portion of the second oil storage tank 430 to move to the first oil storage tank 410.

Meanwhile, as shown in FIG. 10, the oil recovery tank 500 may be provided in the recovery system for large-scale spilled oil flowing onto and adhered to a shore. In the present embodiment, the oil recovery tank 500 is provided on a top portion of a trailer 510 that is moved by the traction of the amphibious vehicle 101, but is not necessarily limited thereto. For example, the oil recovery tank 500 may be mounted on the amphibious vehicle 101. The oil recovery tank 500 may store the oil and the like transferred from the first oil storage tank 410, the second oil storage tank 430, the vacuum tank 260 or the second transfer pump 252 by being connected to the external discharge hose H or the like. When the oil recovery tank 500 is full of oil and the like, the trailer 510 only is separated, and the oil recovery tank 500 only may be quickly replaced, whereby a large amount of the oil may be processed in a short time.

Figure 12:
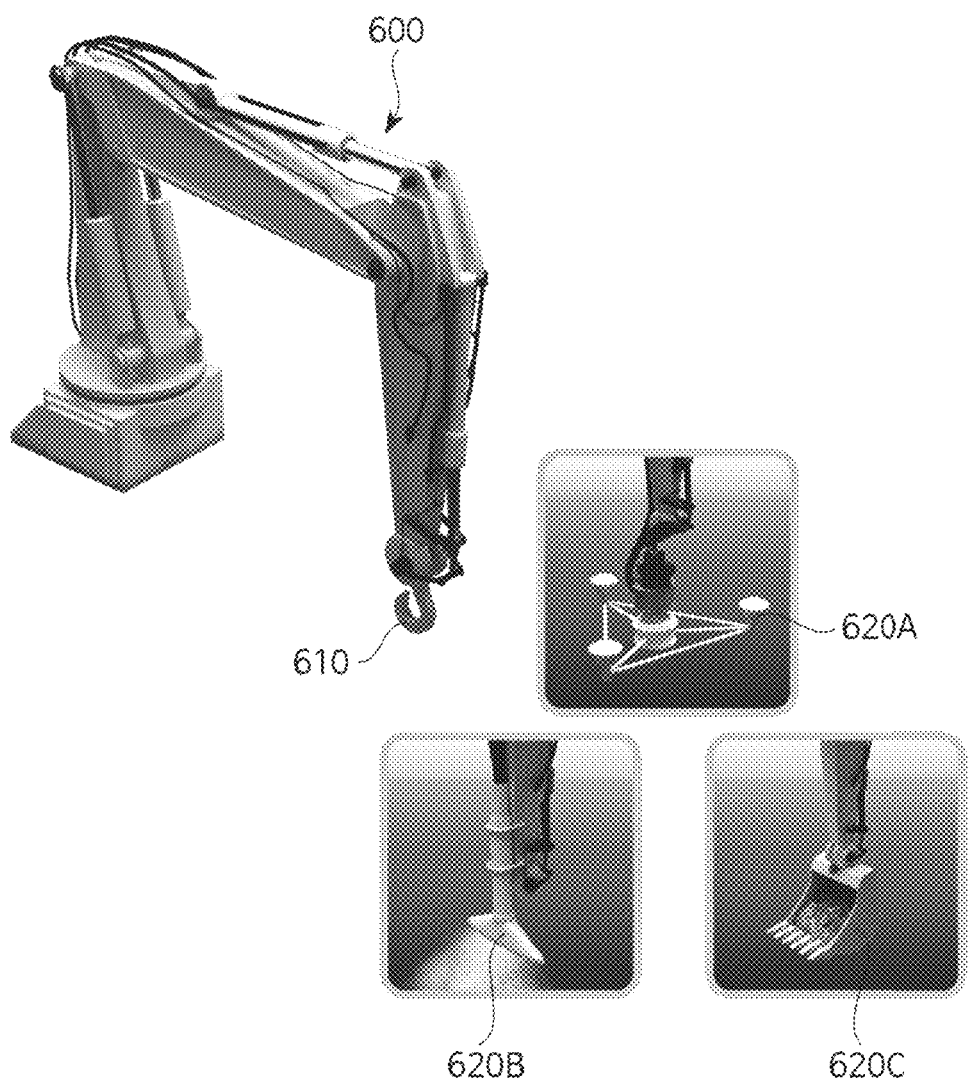
FIG. 12 is a perspective view showing a configuration of a crane of the recovery system for large-scale spilled oil flowing onto and adhered to a shore according to the embodiment of the present disclosure.

Meanwhile, as shown in FIGS. 1, 7, and 12, the crane 600 may be provided in the recovery system for large-scale spilled oil flowing onto and adhered to a shore. Here, the crane 600 is installed on a side of a top portion of the amphibious vehicle 101. In the present embodiment, the crane 600 is installed in a position adjacent to an operation room 112. In addition, the crane 600 may be operated by receiving power from a power source 700 to be described below.

As shown in FIG. 12, a hook member 610 may be provided at one end of the crane 600. Various work tools and equipment, for example, an oil skimmer 620A for vacuuming up and recovering spilled oil on the sea; a separate vacuum suction member 620B; a bucket 620C capable of holding a lump of spilled oil, a lump of solidified oil, and the like as well as the portable nozzle 262; or the like may be selectively coupled to the hook member 610 by being hooked if necessary.

In the present embodiment, the mesh screen box 420 may be moved to the outside with one side thereof being hooked on the hook member 610. In this way, while supporting working so as to be suitable to a field situation, it may improve workability by working by replacing work tools and equipment for recovering various types of oil to the hook member 610 of the crane 600.

Meanwhile, as shown in FIG. 1, the power source 700 may be provided in the recovery system for large-scale spilled oil flowing onto and adhered to a shore. Here, the power source 700 is installed in the amphibious vehicle 101. In this case, the power source 700 serves to supply power to the skimmer assembly 200, the oil collection assembly 300, and the recovered oil treatment assembly 400.

The power source 700 may be connected to the controller C. Here, the controller C serves to control operation of the skimmer assembly 200, the oil collection assembly 300, the recovered oil treatment assembly 400, and the crane 600.

According to the present embodiment configured as above, being mounted on the amphibious vehicle 101 capable of moving on the neritic zone and land, the recovery system of the present disclosure may remove and recover the oil flowing in or adhered to the shore or the neritic zone and land while moving freely around the shoreline or the neritic zone and land. Therefore, it is possible to remove a large amount of the oil within a short period of time, reduce the time and cost required for an oil pollution control work, and work safely.

In addition, according to characteristics of the oil flowing onto and adhered to the shore, the working environment, and the like, the oil is removed and recovered by selectively using the oil collection assembly 300, the brush skimmer 210 of the skimmer assembly 200, the screw skimmer 250, or the like. Therefore, it is possible to efficiently perform the oil pollution control work.

In addition, the oil flowing onto the shore of the spilled oil in the sea is primarily recovered through the skimmer assembly 200. Subsequently, the oil adhered to coastal sand or gravel is desorbed and then transferred to the first oil storage tank 410 or the second oil storage tank 430. In this manner, the oil may be sequentially vacuumed up and recovered. Therefore, since the oil may be removed in stages and recovered quickly, the oil pollution control work may be performed more accurately.

In addition, by increasing the density of the oil dispersed on the seawater surface by the sweeping arms 320 and the spray nozzles 340 of the oil collection assembly 300, an oil recovery rate may be increased. In particular, it is possible to increase the oil recovery rate by moving the sweeping arm 320 to collect the oil in the width direction and by preventing the oil from being moved to a portion out of the opposite end of each of the sweeping arms 320 using the spray nozzles 340. In addition, since the oil may be easily collected toward the skimmer assembly 200, the oil collection efficiency may be further increased.

In addition, the recovered oil treatment assembly 400, in which the oil recovered from the skimmer assembly 200 is accommodated and which is capable of storing the separated oil by separating water from the accommodated oil, may be mounted on the amphibious vehicle 101, thereby allowing the recovered oil to be stored therein in an urgent situation so as to make even emergency response possible. In addition, since a large amount of oil recovered and removed with the skimmer assembly 200 may be stored directly in a separate loading vehicle, for example, an oil recovery tank 500, without passing through an oil storage tank in the vehicle, a large amount of oil may be processed in a short time.

In addition, the water separated through the oil-water separator 440 may be supplied to the spray nozzles 340 of the oil collection assembly 300. Therefore, since it is not necessary to supply seawater and the like by additionally installing a pump and the like in order to supply water to the oil collection assembly 300, not only the number of parts is reduced, but also cost and time may be reduced.

Meanwhile, the present specification and drawings disclose example embodiments of the present disclosure, and although specific terms are used, these are merely used in a general meaning to easily explain the technical content of the present disclosure and to aid understanding of the present disclosure but are not intended to limit the scope of the present disclosure. Besides the embodiments disclosed herein, it is apparent to those of ordinary skill in the art that other modifications based on the technical idea of the present disclosure may be implemented.

What is claimed is:

1. A recovery system for large-scale spilled oil flowing onto and adhered to a shore, which is configured to remove and recover oil flowing onto a shore from the sea or oil adhered to the shore by being mounted on an amphibious vehicle configured to move on a neritic zone and land, the system comprising:
   a skimmer assembly installed in a front of the amphibious vehicle, configured to desorb oil adhered to a surface of coastal sand or gravel, and recover oil by vacuuming up oil flowing onto the shore;
   an oil collection assembly foldably provided on each of front opposite sides of the amphibious vehicle and configured to collect the oil toward the skimmer assembly; and
   a recovered oil treatment assembly configured to selectively accommodate the oil recovered by the skimmer assembly, separate water from the accommodated oil and store the separated oil, and supply the water separated from the oil to the oil collection assembly,
wherein the skimmer assembly comprises:
  a brush skimmer rotatably provided with a rotation roller desorbing oil;
  a scraper configured to desorb oil and foreign substances by scraping off the brush skimmer;
  a skimmer conveyor configured to transfer the oil and foreign substances desorbed by the scraper to the recovered oil treatment assembly; and
  a first transfer pump positioned below the scraper and configured to transfer oil and water dropped from a bottom side of the scraper to the recovered oil treatment assembly or to the outside, and
wherein the brush skimmer further comprises:
  the rotation roller rotatably provided in a horizontal direction and spirally provided with a brush along a longitudinal direction on an outer surface thereof;
  a cover plate having opposite sides rotatably connected to opposite ends of the rotation roller, respectively, and configured to shield a top side of the rotating roller;
  a guide screw rotatably provided inside the cover plate and configured to transfer the oil and foreign substances desorbed by the scraper to an entrance direction of the skimmer conveyor; and
  an oil accommodation vessel positioned below the scraper and configured to accommodate the oil and water dropped from the bottom side of the scraper and provided with the first transfer pump disposed therein.

2. The system of claim 1, further comprising:
connection arms provided in directions parallel to each other in the front of the amphibious vehicle, each of the arms having one side hinge-coupled to a front side of the amphibious vehicle and an opposite side connected to the cover plate.

3. The system of claim 2, wherein the skimmer conveyor comprises:
  a belt part configured to transfer the oil received from the rotation roller to the recovered oil treatment assembly while circulating between the rotation roller and the recovered oil treatment assembly by having one side positioned toward the rotation roller and an opposite side connected to the recovered oil treatment assembly; and
  transfer plates extending in directions orthogonal to and disposed at regular intervals on an outer surface of the belt part.

4. The system of claim 3, wherein a lower end of the skimmer conveyor is configured to be expandable and contractible in a telescopic way and is operated interlocked with the brush skimmer.

5. The system of claim 4, wherein the skimmer assembly further comprises:
  a vacuum suction skimmer positioned at a rear of the brush skimmer and provided with a suction portion for vacuuming up oil floating on a water surface; and
  a vacuum tank connected to the vacuum suction skimmer and configured to transmit vacuum suction force thereto.

6. The system of claim 5, wherein the skimmer assembly further comprises:

a screw skimmer positioned at a rear of the vacuum suction skimmer and rotatably provided with a screw member therein, thereby collecting the oil flowing onto the shore; and
  a second transfer pump configured to transfer oil and water recovered by the screw skimmer to the recovered oil treatment assembly or to the outside.

7. The system of claim 6, wherein the oil collection assembly comprises:
  a supporter provided on each of front opposite sides of the amphibious vehicle;
  a sweeping arm having one side hinge-coupled to one side of the supporter and an opposite side configured to be expandable and contractible in a front direction of the amphibious vehicle;
  a seawater supply pipe installed inside the sweeping arm along a longitudinal direction of the sweeping arm, and configured to receive the water supplied from the recovered oil treatment assembly, and then deliver the water to the sweeping arm; and
  a plurality of spray nozzles installed at regular intervals on a surface of each of the sweeping arms, which face each other, and connected to the seawater supply pipe, and configured to spray the water received from the seawater supply pipe to the outside to induce oil,
  wherein a plurality of sweeping arms is folded to each other to be brought into close contact with the supporter.

8. The system of claim 7, wherein the recovered oil treatment assembly comprises:
  a first oil storage tank configured to accommodate oil transferred from the first transfer pump or the skimmer conveyor;
  a second oil storage tank configured to accommodate oil and water recovered by the first transfer pump or the second transfer pump;
  an oil-water separator configured to separate water from the recovered oil by being connected to the second oil storage tank, and then discharge the separated water to the outside, and supply the separated oil to the first oil storage tank; and
  an oil recovery line connected between the oil-water separator and a lower portion of the first oil storage tank, and configured to transfer the oil separated from the oil-water separator to the first oil storage tank.

9. The system of claim 8, further comprising:
  a floating oil transfer line connected between upper portions of both the first oil storage tank and the second oil storage tank, and configured to transfer the oil floating on the upper portion of the second oil storage tank to the first oil storage tank.

10. The system of claim 9, wherein the second transfer pump comprises:
  a first transfer line having one end connected to the second transfer pump and an opposite end selectively connected to either the first oil storage tank or an external discharge hose extending from the outside; and
  a second transfer line having one end connected to the second transfer pump and an opposite end connected to the second oil storage tank.

11. The system of claim 10, wherein an upper inlet through which solid oil and foreign substances transferred from the skimmer conveyor are introduced is formed on a top portion of the first oil storage tank; and a mesh screen box having a form of a mesh net is detachably provided on an inner upper side of the first oil storage tank, the inner upper side being faced to the upper inlet.

12. The system of claim 11, further comprising:

a crane installed on one side of a top portion of the amphibious vehicle and configured to replaceably couple work tools and equipment for recovering oil to one end thereof.

* * * * *